(12) United States Patent
Persson

(10) Patent No.: US 7,539,715 B2
(45) Date of Patent: May 26, 2009

(54) METHOD AND SYSTEM FOR SATURATING A LEFT SHIFT RESULT USING A STANDARD SHIFTER

(75) Inventor: Niklas Persson, Solna (SE)

(73) Assignee: Via Technologies, Inc., Taipei (TW)

( * ) Notice: Subject to any disclaimer, the term of this patent is extended or adjusted under 35 U.S.C. 154(b) by 856 days.

(21) Appl. No.: 11/036,433

(22) Filed: Jan. 14, 2005

(65) Prior Publication Data

US 2006/0161609 A1    Jul. 20, 2006

(51) Int. Cl.
     *G06F 7/00*    (2006.01)
(52) U.S. Cl. ........................................................ 708/209
(58) Field of Classification Search .................. 708/209
See application file for complete search history.

(56) References Cited

U.S. PATENT DOCUMENTS 5,844,825 A * 12/1998 Wang et al. .................. 708/209
6,304,956 B1 * 10/2001 Tran ............................. 712/221

* cited by examiner

*Primary Examiner*—Tan V Mai
(74) *Attorney, Agent, or Firm*—Thomas, Kayden, Horstemeyer & Bisley

(57) ABSTRACT

A method for left shifting data includes left shifting the data to produce a left-shift result, right shifting the data to produce a right-shift result, and determining if the left-shift result requires saturation based on the right-shift result.

37 Claims, 5 Drawing Sheets

METHOD AND SYSTEM FOR SATURATING A LEFT SHIFT RESULT USING A STANDARD SHIFTER

BACKGROUND

1. Technical Field

The present disclosure relates to saturation and, more specifically, to saturating a left shift result using a standard shifter.

2. Description of the Related Art

Digital Signal Processing (DSP) relates to the examination and manipulation of digital representations of electronic signals. Digital signals that are processed using digital signal processing are often digital representations of real-world audio and/or video.

Digital signal processing often involves examining digital signals in the time domain, spatial domain, frequency domain, autocorrelation domain, and/or wavelet domain. Converting a digital signal between domains generally involves rigorous mathematical computations. Once represented in the desired domain, additional mathematical computations may be performed on the digital signals. For example, various filters may be applied to digital signals. Digital signals may also be subjected to various compression/decompression and encryption/decryption algorithms.

Because digital signal processing often deals with digital representations audio and/or video, digital signal processing must often occur in real-time. Mathematical computations must therefore be performed on the digital signals with little or no observable delay. These mathematical computations may be performed by a general purpose computer system such as a desktop computer or workstation or by specialized digital signal processors (also abbreviated DSP).

Digital signal processors are special-purpose microprocessors that have been optimized for the processing of digital signals. Digital signal processors are generally designed to handle digital signals in real-time, for example, by utilizing a real-time operating system (RTOS). A RTOS is an operating system that may appear to handle multiple tasks simultaneously, for example, as the tasks are received. The RTOS generally prioritizes tasks and allows for the interruption of low-priority tasks by high-priority tasks. The RTOS generally manages memory in a way that minimizes the length of time a unit of memory is locked by one particular task and minimizes the size of the unit of memory that is locked; allowing tasks to be performed asynchronously while minimizing the opportunity for multiple tasks to try to access the same block of memory at the same time.

Digital signal processors are commonly used in embedded systems. An embedded system is a specific-purpose computer that is integrated into a larger device. Embedded systems generally utilize a small-footprint RTOS that has been customized for a particular purpose. Digital signal processing is often implemented using embedded systems comprising a digital signal processor and a RTOS.

Digital signals processed by digital signal processors may be represented as a binary series of ones and zeroes. Digital signal processors must therefore be able to handle binary numbers quickly and in high volumes so that the digital signal processors may maintain its real-time character.

While the binary numbering system can easily express positive numbers, expressing negative numbers in binary is more complicated. One method that has been devised for the expression of negative binary numbers is to utilize signed binary numerals. According to this method, a single bit, usually placed before the number, may represent the sign of the number. For example, if the first bit is "1" then the number that follows may be negative while if the first bit is "0" then the number that follows may be positive. For example, the 4-bit number "0010" generally represents the number 2 in standard binary notation. Using signed binary numbers, positive 2 may be expressed as the 5-bit number "00010" where the first digit is the sign bit. Similarly, "10010" may represent negative 2.

This method for expressing negative binary numbers has several disadvantages. For example, there are two different representations for the number zero as both "00000" and "10000" may be taken to have the same value. Additionally, there is the related problem of performing mathematical calculations on signed binary numbers. For example, addition and subtraction are complicated. For example, adding the numbers "00010" (2) with "10010" (−2) using conventional techniques for adding binary numbers would result in the number "10100" (−4). Therefore, when performing arithmetic functions on signed digital numbers, such as calculations commonly performed by digital signal processors, special care must be taken thereby complicating the use of hardware implementing conventional techniques for adding and/or subtracting binary numbers. This special care may decrease performance and/increase expense associated with digital signal processors.

To circumvent the problems associated with signed binary numbers, the two's compliment method is commonly utilized. According to the two's compliment method, the left-most bit of a number, the most significant bit (MSB), may indicate the sign of the number. Where the MSB is zero, the number is positive and where the MSB is one, the number is negative, however unlike the signed binary numbers described above; the MSB is part of the number, affecting both the sign and the value of the expressed number.

According to the two's compliment method, positive numbers may be expressed, for example as in a5-bit number, as "00000" (0) through "01111" (15). While the number may be of any number of bits, the first bit remains as a zero for positive numbers. The value of a positive number according to the two's compliment method is interpreted exactly as it would be in standard binary.

According to the two's compliment method, negative numbers appear as the two's compliment of the corresponding positive number. To calculate the two's compliment, one is added to the one's complement of the number. The one's complement is the inverse of each digit. For example, the one's complement of "00011" (3) is "11100." Therefore, the two's complement of "00011" (3) is "11101" which has the value of −3.

The two's complement notation has several advantages. For example, zero has only one representation (00000). Additionally, arithmetic functions may be performed on numbers using standard techniques and hardware. For example:

$$\begin{array}{r}00011\ (3)\\ +00010\ (2)\\ \hline 00101\ (5)\end{array}$$

And for example:

$$\begin{array}{r}00011\ (3)\\ +11101\ (-3)\\ \hline 00000\ (0)\end{array}$$

As seen in the example above, where three is added with the negative three, standard arithmetic functions may be performed to arrive at the correct result. However, the correct result depends on the tendency for binary numbers, represented as a fixed number of bits, to drop a digit that should be carried beyond the MSB. This tendency is known as overflow.

While overflow is constructively utilized when performing subtraction, the adding of two large positive operands, for example, may also result in overflow as the MSB takes on a value of 1. In such a case, adding two positive numbers may imprecisely cause the result to rollover into a negative number. To avoid rollover, operations performed in two's complement should be able to detect the overflow and either saturate the result to the most positive or most negative value that may be represented or generate an error.

While saturation does not technically produce the correct result, it produces the result that is as near as possible to the desired result. In the art of digital signal processing, the saturated result is generally preferred to a result that has been rolled over. For example, when adding to the amplitude of a digital signal representing an acoustic wave form such that the new amplitude should be higher than can be expressed, it may be preferable to have the amplitude saturate at the maximum expressible amplitude rather than have the amplitude become a negative value or simply disregarded. Saturation may therefore be an important part of mathematical operations relating to digital signal processing.

One common mathematical operation that may be performed to digital numbers, for example digital signals, is multiplication by powers of two, for example the number may be multiplied by two ($2^1$). A number expressed in binary form may be multiplied by two by performing a left shift on the digits of the number. In performing the left shift, each digit is moved to the left by one places and the least significant bit (LSB) may take on a zero value. For example 00011 (3), when shifted to the left by one place becomes 00110 (6), which is equal to 3×2. Left shifting by multiple places may similarly be used to multiply the number by a power of two. For example, left shifting a number by two places produces a multiplication of $2^2$ (4), left shifting a number by three places produces a multiplication of $2^3$ (8), etc.

Left shifting of numbers expressed in two's complement notation may work accurately as long as the bits being shifted out of the number express only zeroes for a positive number or only ones for a negative number and the MSB remains unchanged. However, complications may arise when a one is left shifted either to the MSB or out of the number all together with respect to a positive number or when a zero is left shifter either to the MSB or out of the number all together with respect to a negative number. For example, 01001 (9) left shifted two place results in 00100 (4).

It may therefore be desirable to perform a left shift capable of saturation so that as in the example above, left shifting 01001 (9) would result in the maximum obtainable value 011111 (15) rather than 00100 (4). However, standard hardware shifters using operands expressed in two's compliment notation generally do not support correct saturation after a left shift. It is therefore desirable to utilize hardware that can perform a left shift and be capable of proper saturation.

SUMMARY

A method for left shifting data includes left shifting the data to produce a left-shift result, right shifting the data to produce a right-shift result, and determining if the left-shift result requires saturation based on the right-shift result.

A system for left shifting data includes a left shift channel for left shifting data, an arithmetic right shift channel for right shifting the data, wherein the right shift channel right shifts the data such that the result of the right shift comprises bits that are identical to bits that were shifted out of the left shift channel.

A computer system includes a processor and a program storage device readable by the computer system, embodying a program of instructions executable by the processor to perform method steps for left shifting data. The method includes left shifting the data to produce a left-shift result, right shifting the data to produce a right-shift result, and determining if the left-shift result requires saturation based on the right-shift result.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
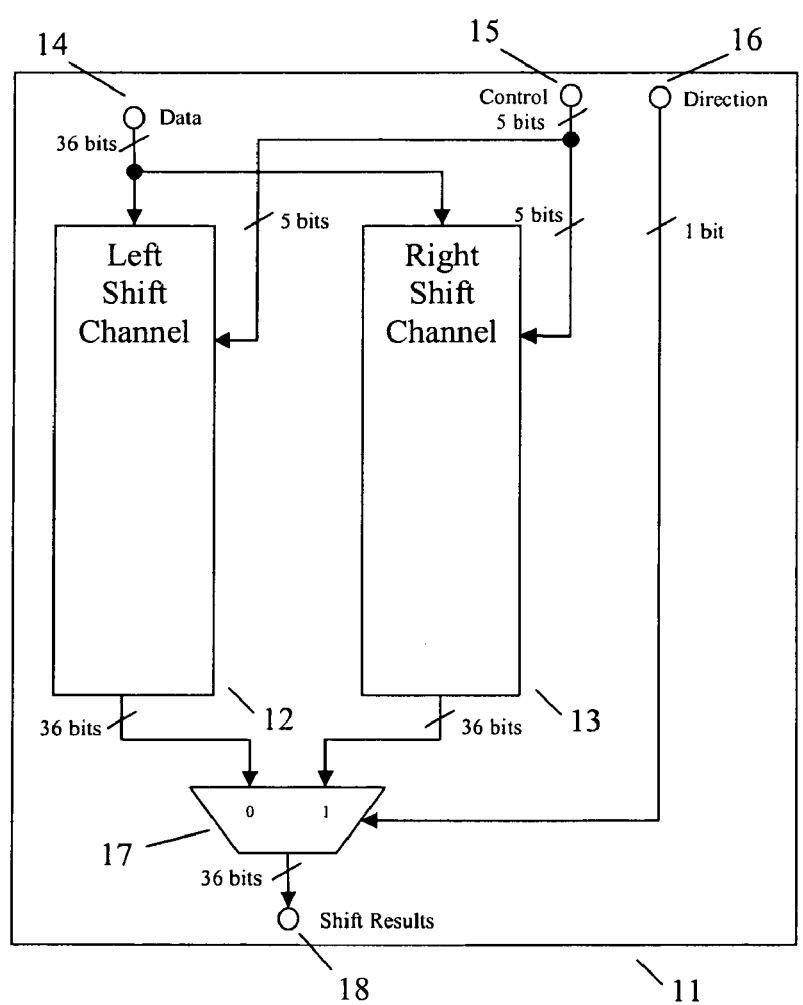
FIG. 1 is a block diagram showing a left/right arithmetic shifter.

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Left shifters used for multiplication of operands by powers of two and right arithmetic shifters used for division of operands by powers of two are often bundled together in a left/right arithmetic shifter comprising one left shift channel and one right arithmetic shift channel. FIG. 1 is a block diagram showing a left/right arithmetic shifter. The left/right arithmetic shifter 11 comprises a left shift channel 12 and a right shift channel 13. A data word 14 may be delivered to both the left shift channel 12 and the right arithmetic shift channel 13. The data word 14 may be, for example, a 36-bit word. The 36-bit word may be, for example, a 32-bit word with a 4-bit guard. A guard is a set of bits that appears before the MSB that serve to prevent overflow of up to the size of the guard. The guard is therefore may not be thought of as part of the data word and therefore the data word may be thought of as a 32-bit word. The 32-bit data word 14 may contain a binary expression of the number to be shifted.

A control word 15 may be delivered to both the left shift channel 12 and the right arithmetic shift channel 13 to specify the number of places to shift the 32-bit data word 14 by. For example, the control word 15 may be a 5-bit control word 15. The output of both the left shift channel 12 and the right arithmetic shift channel 13 may be delivered to a two-input multiplexer 17. A direction bit 16 may also be delivered to the two-input multiplexed 17 to determine whether the left shift result or the right arithmetic shift result should be returned as the shift result 18.

While the left/right arithmetic shifter 11 may be used to perform mathematical operations on numbers, for example the 32-bit data word 25, which may be represented in two's complement notation, the left/right arithmetic shifter 11 may not be able to properly saturate values that exceed the maximum values allowed by the length of the operand. For example, the left/right arithmetic shifter 11 may not be able to properly saturate a large data word that is left shifted by a large number of places.

Figure 2:
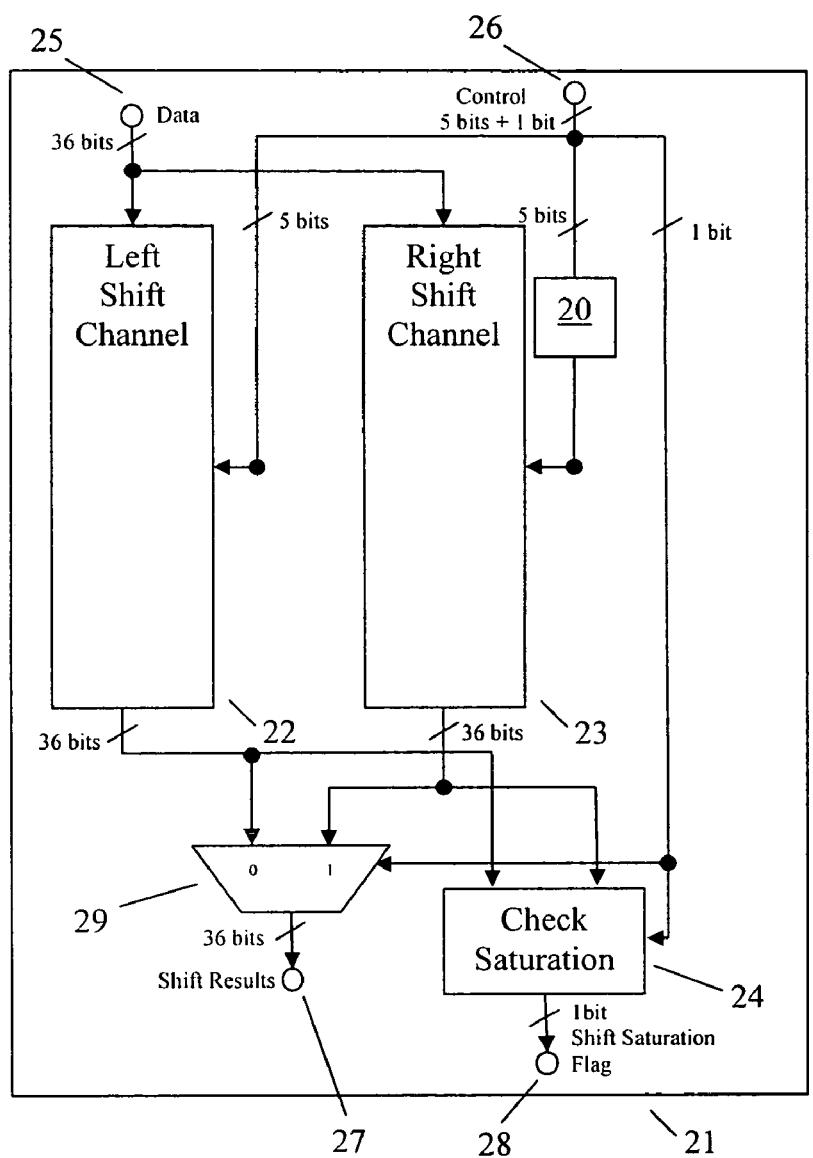
FIG. 2 is a block diagram showing a left/right arithmetic shifter that has been configured to be capable of saturation according to an embodiment of the present invention.

Embodiments of the present invention seek to utilize a left/right arithmetic shifter such as the shifter described above and illustrated in FIG. 1 to perform left shifting that is capable of saturation, for example beyond the protection provided by a set of guard bit that may be present. FIG. 2 is a block diagram showing a left/right arithmetic shifter that has been configured to be capable of saturation according to an embodiment of the present invention.

A data word 25 may be provided to the left/right arithmetic shifter 21, for example, a 32-bit data word 25 may be provided. As described above, the left/right arithmetic shifter 21 may be able to accept a 36-bit word, for example where 32-bits are reserved for the operand and 4-bits are reserved as overflow guard bits. The data word 25 may be delivered to both a left shift channel 22 and a right arithmetic shift channel 23. A control word 26 may be provided to the left/right arithmetic shifter 21, for example, a 5-bit control word 26 may be provided to indicate how many places the data word 25 should be left shifted. While embodiments of the present invention may be designed using a data word 25 of any number of bits, the control word 26 should contain enough bits to represent a shift through all of the bits of the data word 25.

The control word 26 may also include a direction bit. In such a case the control word 26 may be a 6-bit word where the direction bit is separated out. Alternatively the direction bit may be independently provided as in the example above.

The control word 26 may be delivered to the left shift channel 22, for example in its original form. The control word 26 may be delivered to the right arithmetic shift channel 23 after first passing through a bitwise not gate, inverter or some other modifying element 20 capable of modifying the control word 26. For example, the modifying element 20 may determine the, one's complement, two's complement, or some other conversion of the control word 26 to the right arithmetic shift channel 23 such that the right shift channel 23 will produce a result equal to the out-shifted bits of the result from the left shift channel 22. For example, where the control word 26 is "11000" (24) indicating a shift of 24 bits, the left shift channel 22 will shift the data word 25 by twenty-four places thereby out-shifting twenty-four bits. The right shift channel 23 may then receive the two's complement of the control word 26 from the modifying element 20 which is "01000" (8) and right shift the data word 25 by 8 places thereby producing a result that equals the 24 bits that were out-shifted from the left shift channel 22.

A saturation checking unit 24 may then examine the result from the right shift channel concatenated with the MSB of the result from the left shift channel to determine if information has been lost. Information will appear to have been lost if the concatenated value is not either all ones or all zeroes. For example, if the concatenated value includes both ones and zeroes then it may be determined that information has been lost and saturation is needed. The proper saturation value may then be determined based on the result from the right shift channel. For example, where if the result is positive, for example, the number begins with a zero, then the shift result may be set to the maximum positive value, for example 0111 1111 1111 1111 1111 1111 1111 1111 where the result is a 32-bit word (for example a 36-bit word with a 4-bit guard). If the result is negative, for example, the number begins with a one, then the shift result may be set to the maximum negative value, for example 1000 0000 0000 0000 0000 0000 0000 0000 where the result is a 32-bit word.

An alternative to concatenating the results from the right shift channel with the MSB from the results of the left shift channel is to modify the control word that the right shift is based on such that the MSB from the results of the left shift channel is part of the results of the right shift channel. For example, the arithmetic right shift channel may shift the data by one additional bit. This may be implemented, for example, by utilizing a modifying element that performs a one's complement rather than a two's complement. For example, the modifying element may be a bitwise not gate element.

The saturation checking unit 24 may or may not calculate the saturation value. For example, the saturation checking unit 24 may generate a shift saturation flag bit 28 that indicates whether the value requires saturation. The saturation flag bit 28 and the shift results 27 may be delivered from the left/right arithmetic shifter 21.

Figure 3:
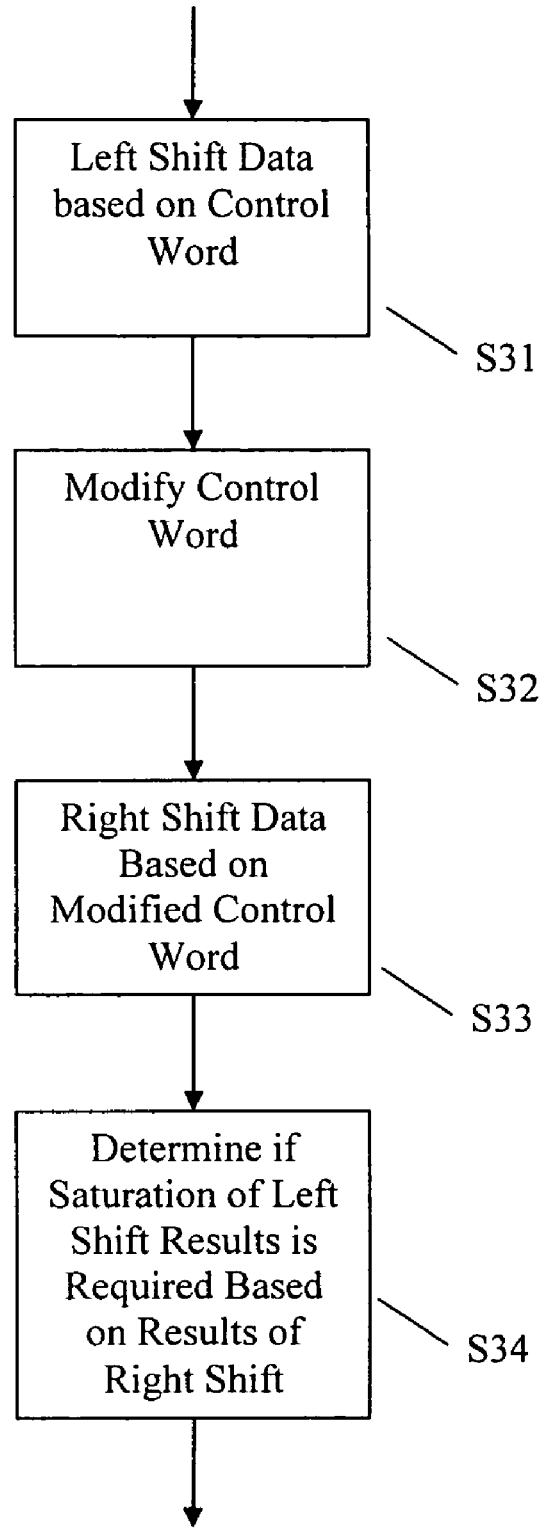
FIG. 3 is a flow chart showing a method for performing a left shift that is capable of saturation according to an embodiment of the present invention.

FIG. 3 is a flow chart showing a method for performing a left shift that is capable of saturation according to an embodiment of the present invention. Provided data may be left shifted by a number of bits determined by a control word (Step S31). The control word may then be modified such that when the control word determines how the data is right-shifted; the results of the right shift are the bits that were out-shifted from the left shift (Step S32). The data may be right shifted based on the modified control word (Step S33). The data that is right shifted may be a copy of the data that is left shifted. Finally the results of the right shift concatenated with the MSB of the left shift results may be examined to determine if the left shift results require saturation (Step S34). If saturation is required then the left shift results may be saturated.

Figure 4:
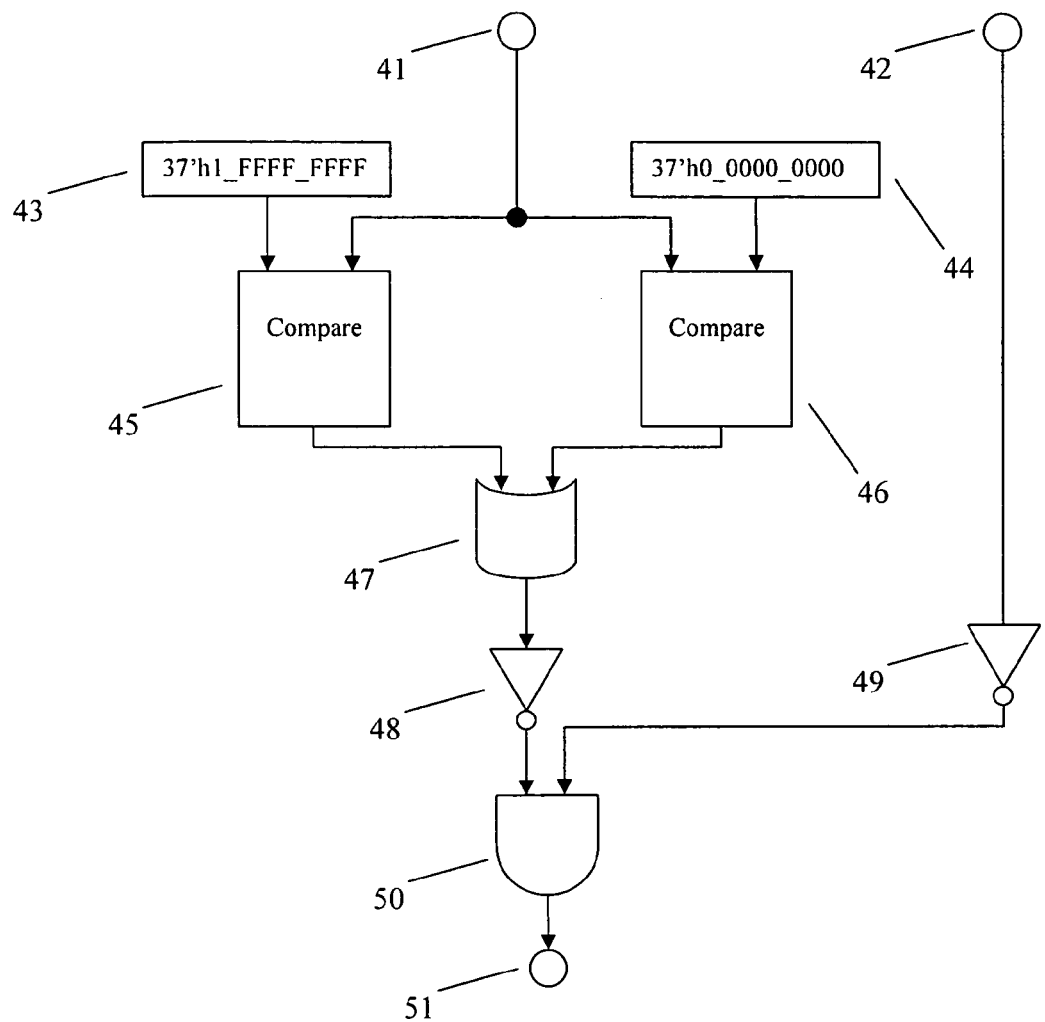
FIG. 4 is a block diagram showing a saturation checking unit according to an embodiment of the present invention.

FIG. 4 is a block diagram showing a saturation checking unit according to an embodiment of the present invention. Node 41 may receive the sign bit from the left channel output along with the 36-bit output from the arithmetic right shift channel as a single 37-bit word. Node 42 may receive the direction bit of the control word discussed above. The 37-bit input may be compared by a first comparator 45 to determine if the input is larger than the largest expressible number 43. The input may be compared by a second comparator 46 to determine if the input is smaller than the smallest expressible number 44. Because saturation occurs when either the input is larger than the largest expressible number 43 or smaller than the smallest expressible number 44, an "OR gate" 47 may be used to determine when saturation occurs. However, according to one embodiment of the present invention, the direction bit receives a logical 0 if a left shift is performed. Therefore the bit has to be inverted before an "AND gate" 50. The results of the "OR gate" 47 may be inverted using an inverter 48 and input into the "AND gate" 50.

The direction bit from node 42 may be sent to an inverter 49. The output of the inverter 49 may also be sent to the "AND gate" 50. Therefore, the direction bit stops the saturation flag generation if a right shift occurs. The results of the "AND gate" 50 may be sent to the output node 51.

Figure 5:
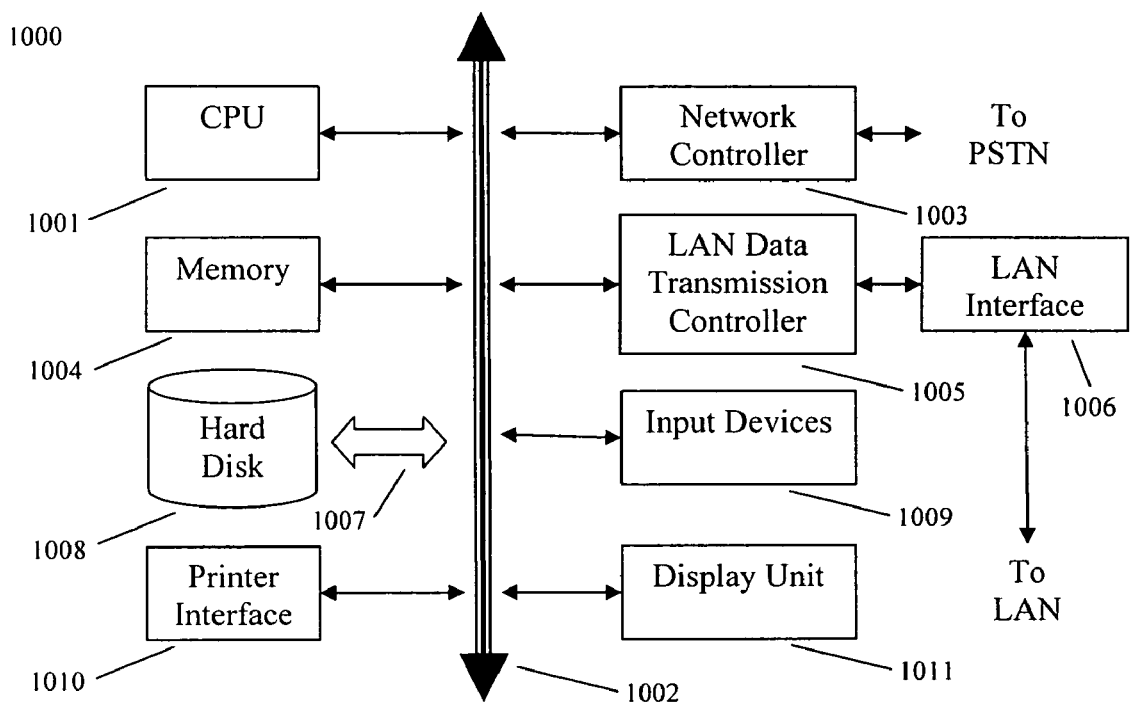
FIG. 5 shows an example of a computer system capable of implementing the method and apparatus according to embodiments of the present disclosure.

FIG. 5 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc.

As shown, the system 1000 may be connected to a data storage device, for example, a hard disk, 1008 via a link 1007.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method performed in a digital signal processor circuit for left shifting data, comprising:
    left shifting the data to produce a left-shift result;
    right shifting the data to produce a right-shift result; and
    determining if the left-shift result requires saturation based on the right-shift result.

2. The method of claim 1, wherein the right-shift results comprise bits identical to out-shifted bits from the left shifting.

3. The method of claim 1, wherein the left shifting the data comprises left shifting the data by a number of bits indicated by a left-shifting control word and the right shifting the data is comprises right shifting the data by a number of bits indicated by a right-shifting control word.

4. The method of claim 3, wherein the right-shifting control word is based on the left-shifting control word.

5. The method of claim 3, wherein the right-shifting control word is the one's complement of the left-shifting control word.

6. The method of claim 3, wherein the right-shifting control word is the two's complement of the left-shifting control word.

7. The method of claim 1, wherein determining if the left-shift result requires saturation based on the right-shift result comprises determining if the left-shift result requires saturation based on both the right-shift result and the left-shift result.

8. The method of claim 1, wherein determining if the left-shift result requires saturation based on the right-shift result comprises determining if the left-shift result requires saturation based on both the right-shift result and the MSB of the left-shift result.

9. The method of claim 1, wherein determining if the left-shift result requires saturation based on the right-shift result comprises:
    concatenating the MSB of the left-shift result with the right-shift result;
    determining if the concatenation includes both ones and zeroes; and
    determining that the left-shift result requires saturation when it is determined that the concatenation includes both ones and zeroes.
    replacing the left-shift result with the largest positive value that can be expressed when it is determined that the left-shift result should be saturated positive; and
    replacing the left-shift result with the largest negative value that can be expressed when it is determined that the left-shift result should not be saturated positive.

10. The method of claim 1, additionally comprising generating a flag when it is determined that the left-shift result requires saturation.

11. The method of claim 10, additionally comprising saturating the left-shift result when the flag has been generated.

12. The method of claim 11, wherein saturating the left-shift result comprises:
    determining if the left-shift result should be saturated positive based on the right-shift result;
    replacing the left-shift result with the largest positive value that can be expressed when it is determined that the left-shift result should be saturated positive; and
    replacing the left-shift result with the largest negative value that can be expressed when it is determined that the left-shift result should not be saturated positive.

13. The method of claim 1, additionally comprising saturating the left-shift result when it is determined that the left-shift result requires saturation.

14. The method of claim 13, wherein saturating the left-shift result comprises:
    determining if the left-shift result should be saturated positive based on the right-shift result;
    replacing the left-shift result with the largest postitive value that can be expressed when it is determined that the left-shift result should be saturated positive; and
    replacing the left-shifting result with the largest negative value that can be expressed when it is determined that the left-shift result should not be saturated positive.

15. A system for left shifting data in a digital signal processor, comprising:
    a left shift channel for left shifting data;
    an arithmetic right shift channel for right shifting the data, wherein the right shift channel right shifts the data such that the result of the right shift comprises bits that are identical to bits that were shifted out of the left shift channel; and
    a saturation checking unit for determining if the left-shift result requires saturation based on the right-shift result.

16. The system of claim 15, additionally comprising:
    a left-shifting control word for indicating by how many bits the left shift channel shifts the data; and
    a right-shifting control word for indicating by how many bits the right shift channel shifts the data,
    wherein the right-shifting control word is based on the left-shifting control word.

17. The system of claim 16, further comprising a modifying element for generating the
    right-shifting control word using the left-shifting control word.

18. The system of claim 16, further comprising a modifying element for generating the right-shifting control word by calculating the one's complement of the left-shifting control word.

19. The system of claim 16, further comprising a modifying element for generating the right-shifting control word by calculating the two's complement of the left-shifting control word.

20. The system of claim 15, wherein the saturation checking unit determines if the left-shift result requires saturation based on the right-shift result by determining if the left-shift result requires saturation based on both the right-shift result and the left-shift result.

21. The system of claim 15, wherein the saturation checking unit determines if the left-shift result requires saturation based on the right-shift result by determining if the left-shift result requires saturation based on both the right-shift result and the MSB of the left-shift result.

22. The system of claim 15, wherein the determining if the left-shift result requires saturation based on the right-shift result comprises:
    concatenating the MSB of the left-shift result with the right-shift result;
    determining if the concatenation includes both ones and zeroes; and determining that the left-shift result requires saturation when it is determined that the concatenation includes both ones and zeroes.

23. The system of claim 15, wherein the saturation checking unit generates a flag when it is determined that the left-shift result requires saturation.

24. A computer system comprising:
a processor; and
a program storage device readable by the computer system, embodying a program of instructions executable by the processor to perform method steps for left shifting data, the method comprising:
left shifting the data to produce a left-shift result;
right shifting the data to produce a right-shift result; and
determining if the left-shift result requires saturation based on the right-shift result.

25. The computer system of claim 24, wherein the right-shift results comprise bits identical to out-shifted bits from the left shifting.

26. The computer system of claim 24, wherein the left shifting the data comprises left shifting the data by a number of bits indicated by a left-shifting control word and the right shifting the data is comprises right shifting the data by a number of bits indicated by a right-shifting control word.

27. The computer system of claim 26, wherein the right-shifting control word is based on the left-shifting control word.

28. The computer system of claim 26, wherein the right-shifting control word is the one's complement of the left-shifting control word.

29. The computer system of claim 26, wherein the right-shifting control word is the two's complement of the left-shifting control word.

30. The computer system of claim 24, wherein determining if the left-shift result requires saturation based on the right-shift result comprises determining if the left-shift result requires saturation based on both the right-shift result and the left-shift result.

31. The computer system of claim 24, wherein determining if the left-shift result requires saturation based on the right-shift result comprises determining if the left-shift result requires saturation based on both the right-shift result and the MSB of the left-shift result.

32. The computer system of claim 24, wherein determining if the left-shift result requires saturation based on the right-shift result comprises:
concatenating the MSB of the left-shift result with the right-shift result;
determining if the concatenation includes both ones and zeroes; and
determining that the left-shift result requires saturation when it is determined that the concatenation includes both ones and zeroes.

33. The computer system of claim 24, additionally comprising generating a flag when it is determined that the left-shift result requires saturation.

34. The computer system of claim 33, additionally comprising saturating the left-shift result when the flag has been generated.

35. The computer system of claim 34, wherein saturating the left-shift result comprises:
determining if the left-shift result should be saturated positive based on the right-shift result;
replacing the left-shift result with the largest positive value that can be expressed when it is determined that the left-shift result should be saturated positive; and
replacing the left-shift result with the largest negative value that can be expressed when it is determined that the left-shift result should not be saturated positive.

36. The computer system of claim 24, additionally comprising saturating the left-shift result when it is determined that the left-shift result requires saturation.

37. The computer system of claim 36, wherein saturating the left-shift result comprises:
determining if the left-shift result should be saturated positive based on the right-shift result;
replacing the left-shift result with the largest positive value that can be expressed when it is determined that the left-shift result should be saturated positive; and
replacing the left-shift result with the largest negative value that can be expressed when it is determined that the left-shift result should not be saturated positive.

* * * * *